United States Patent [19]

Rothrock

[11] Patent Number: 5,764,902
[45] Date of Patent: Jun. 9, 1998

[54] CONDITIONAL INSERT OR MERGE IN A DATA CONFERENCE

[75] Inventor: Lewis V. Rothrock, Beaverton, Oreg.

[73] Assignee: Intel Corporation, Santa Clara, Calif.

[21] Appl. No.: 536,824

[22] Filed: Sep. 29, 1995

[51] Int. Cl.⁶ .................................................. G06F 13/00
[52] U.S. Cl. .................. 395/200.35; 395/200.34; 395/200.31; 395/200.78; 395/331; 395/332; 395/330; 395/200.33; 364/242.6; 364/242.94; 364/284.4; 370/260; 370/270
[58] Field of Search ............................ 364/514 R, 514 A, 364/514 C, 242.1, 242.2, 242.6, 242.94, 284.4; 395/200.01, 200.03, 200.04, 200.08, 200.18, 200.19, 299, 300, 311, 444, 614, 615, 608–610, 603, 605, 200.3, 200.31–200.37, 200.43, 200.76, 200.78, 330–332, 684; 370/260, 270, 433, 437, 441

[56] References Cited

U.S. PATENT DOCUMENTS

| | | | |
|---|---|---|---|
| 5,252,951 | 10/1993 | Tannenbaum et al. | 345/156 |
| 5,293,619 | 3/1994 | Dean | 395/682 |
| 5,309,555 | 5/1994 | Akins et al. | 395/330 |
| 5,353,398 | 10/1994 | Kitahara et al. | 395/332 |
| 5,392,400 | 2/1995 | Berkowitz et al. | 395/200.33 |
| 5,408,470 | 4/1995 | Rothrock et al. | 370/261 |
| 5,423,038 | 6/1995 | Davis | 395/683 |
| 5,452,299 | 9/1995 | Thessin et al. | 370/260 |
| 5,548,726 | 8/1996 | Pettus | 395/200.51 |
| 5,566,302 | 10/1996 | Khalidi et al. | 395/680 |
| 5,577,251 | 11/1996 | Hamilton et al. | 395/671 |
| 5,581,702 | 12/1996 | McArdle et al. | 395/200.34 |
| 5,608,872 | 3/1997 | Schwartz et al. | 395/200.35 |

OTHER PUBLICATIONS

"Intel ProShareTM Personal Conferencing Software"—Getting Started Guide, Intel Corporation, 2nd Edition, pp. iii–iv & 25–31, May 1994.

Primary Examiner—James P. Trammell
Assistant Examiner—Tuan Q. Dam
Attorney, Agent, or Firm—William H. Murray; N. Stephan Kinsella

[57] ABSTRACT

A method, data conferencing system, and storage medium for inserting an annotation made by a node of a data conferencing system having a plurality of nodes, wherein only one node at a time is an arbiter node. According to a preferred embodiment, the node inserts at an index for indexing an indexed object a container object for containing the annotation. If the node is not the arbiter node, then the node requests to be the arbiter node. If the node is the arbiter node, then the node determines whether the current indexed object is identical to the container object. If the current indexed object is not identical to the container object, then the node merges the annotation with the current indexed object and deletes the container object.

27 Claims, 7 Drawing Sheets

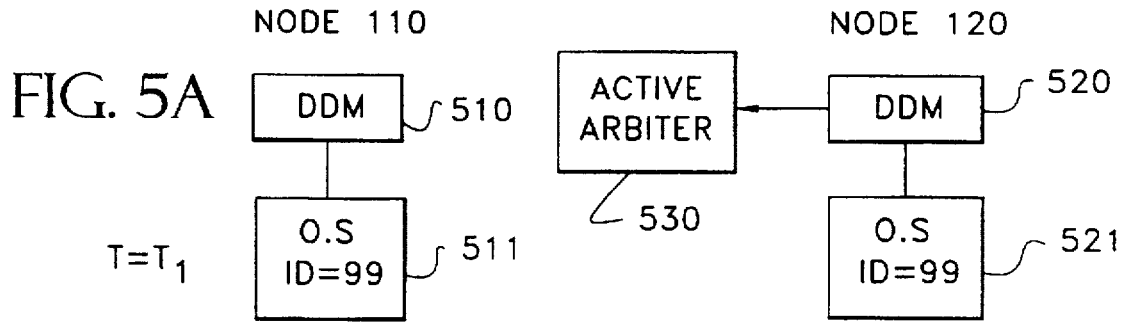
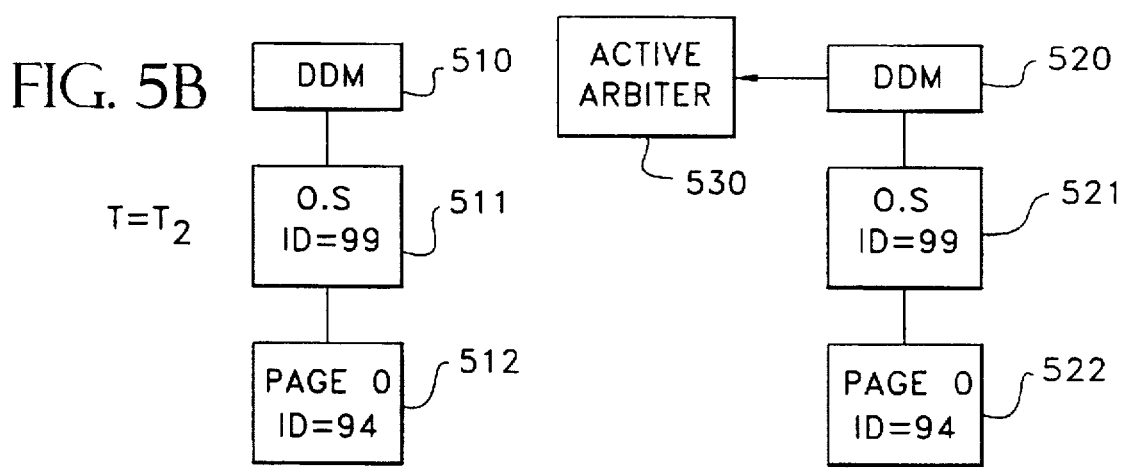
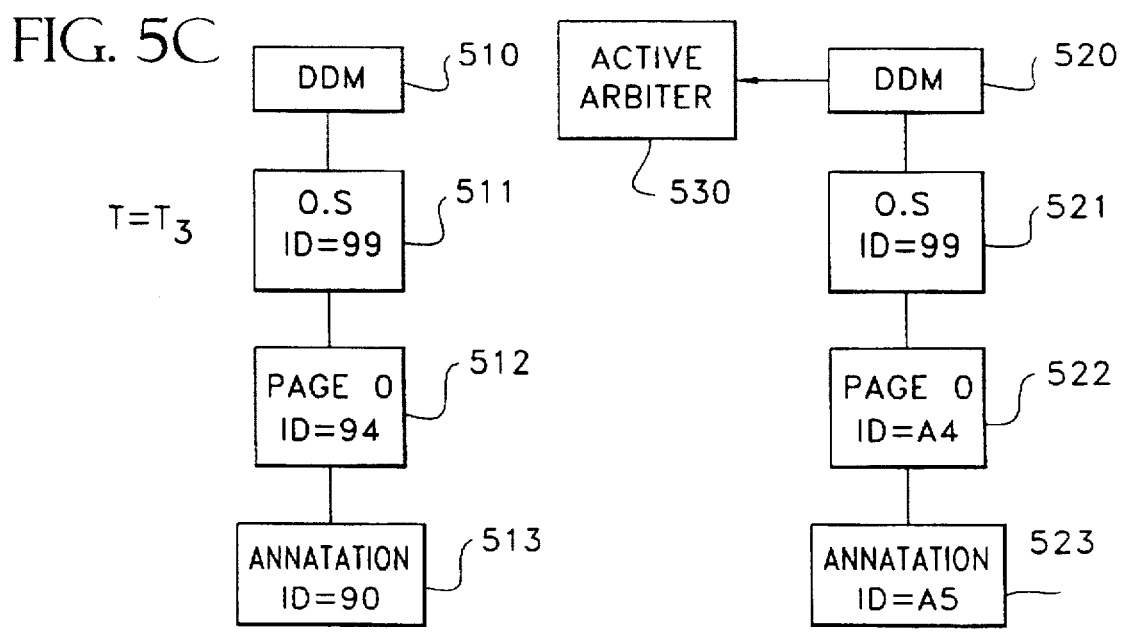

CONDITIONAL INSERT OR MERGE IN A DATA CONFERENCE

BACKGROUND OF THE INVENTION

1. Field of the Invention

The present invention relates to data conferencing systems, and, in particular, to mechanisms for providing for conditional insert or merge of data annotations in a data conferencing application.

2. Description of the Related Art

In data conferencing systems, there is a need for synchronization of distributed data in the conference. In data conferencing systems such as teleconferencing systems, a plurality of users are provided with the ability to have an electronic on-line meeting even if the users are not physically in the same room or building. Using such application programs, modern communication systems have enabled the ability to have a "meeting" wherein all users participate in the meeting through their individual computer systems and share data, graphics, text, and other types of information. Users may communicate with one another, sharing data in the form of graphical images, text, or other "annotations" and other information represented on the computer system display. This is analogous to a meeting where participants in a face-to-face meeting may display information to one another on a whiteboard and other participants may add annotations, delete, or otherwise modify the board. In some usages, video data may also be shared among a plurality of connected users during such teleconferences, or video conferences.

One of the requisites of an electronic conferencing system is the need to replicate the same data on all users' displays participating in the conference. Such systems typically implement this capability in a variety of ways. The most common is the client/server model wherein a single connected node acts as a "server" of other nodes in the system and the remaining nodes connected in the conference act as slaves or clients to the server process. Thus, each of the clients merely receive data from the central machine to update their displays. Such systems, however, are entirely dependent upon the service being provided by the server and the throughput of the communication medium. Systems wherein the clients merely act as displays and inputs for user requests suffer from severe performance problems due to resulting updates of data from the server, which is typically handled serially by the server.

Another prior art solution for maintaining as synchronous all of a participant's display in a conferencing system relies on a distributed client/server system. In such a system, a shared object structure is kept on the server and clients are made aware of changes of that distributed information through alerts or demons. The disadvantage of this approach is the reliance on the architecture itself. This includes a data conferencing application which must be able to connect several users over a phone line from point to point without requiring access to a centralized common server.

In the client/server approach, moreover, performance suffers greatly because requests to add or delete objects such as annotations, graphical images, or other information on a participant's display is entirely dependent upon communication from the server. Thus, real-time performance severely suffers in prior art client/server models since approval to act upon and manipulate objects on a participant's display is entirely dependent upon a whole set of dependent variables such as the number of requests to the server pending, the throughput of the communication medium, the number of participants connected, and the like.

Yet another prior art approach for maintaining the synchronousness of a plurality of participants in a conferencing system is the use of a distributed object-oriented system. This is a generalized approach which relies upon extensions, in one prior art solution, of the SmallTalk language itself. In this prior art system, "local" objects send messages to "proxy" objects which are local representatives for objects in the "shared" object space. The proxy objects communicate with the real objects through an RPC (Remote Procedure Call) mechanism. RPC is a protocol governing the method with which an application activates processes on other nodes and retrieves the results. Such a conventional mechanism is defines by Sun Microsystems, Inc. and described in RFC-1057 that provides a standard for initiating and controlling processes on remote or distributed computer systems.

The problem with this approach is in its generality which requires extensive support for sharing any object while making no assumptions about the behavior of objects. This has two disadvantages. First, a complete "SmallTalk system" is needed to support the distribution of objects in general. Second, the concurrency problem for any object is difficult because multiple participants may have different objects in their systems and such different objects may not be able to be communicated to the remaining users.

Yet another of the disadvantages of prior art data conferencing systems is their mechanism for supporting the transfer of very large blocks of information. Typically, such systems have relied upon point-to-point communication schemes wherein individual nodes such as the server, in the client/server model, must transmit the information from one individual node to the server and then from the server to the remaining participants' systems. Also, the transfer of very large pieces of data, such as files and/or images or other data, consumes a relatively large amount of resources in the system and bandwidth of the communication medium. Thus, prior art conferencing systems suffer from severe performance difficulties caused by the amount of data which may be transmitted within the system during a teleconference.

During a distributed data conference, conference objects are replicated on all nodes in object stores and must be kept synchronous to ensure that each user's view and conference objects are identical. An arbiter object may be utilized to synchronize the distributed data for this purpose. One such technique is taught in U.S. patent application Ser. No. 08/137,320, filed Oct. 14, 1993, now issued as U.S. Pat. No. 5,408,470, entitled "Deferred Synchronization of Distributed Objects," the entirety of which is incorporated herein by reference. In such arbitration schemes, the arbiter object is used to schedule changes to various objects instantiated on various nodes of the conference, for example adding, moving, or merging pages or other object stores, and the like. The arbiter object thus acts as a synchronization point, but if the arbiter node is busy waiting for an operation to complete, which is necessary since a distributed data conference has asynchronous events, then other requests that require arbitration will be blocked until the arbiter object is free to schedule these requests.

Another problem that can arise in a distributed data conferencing system occurs when two or more users perform simultaneous, conflicting actions. If one user had first annotated the blank screen, then a new page with the first annotation would be created and distributed to the conference application of the other user's node. Then if the second user a short time later began a second annotation, the second annotation would be added to the page, and the second annotation distributed to all other nodes on the network.

However, two users may substantially simultaneously create annotations on blank screens, causing two new pages, each with a different annotation, to form. Some prior art conferencing systems address this problem by "turn taking," in which only one user is allowed to make modifications at a time. However, this technique is not very user friendly, for example for small "free for all" type conferences. Other prior art applications simply overwrite one of the conflicting annotations to address this problem. However, this fails to preserve each user's annotations.

Thus, prior art data conferencing systems suffer from several disadvantages.

SUMMARY

There is provided herein a method, data conferencing system, and storage medium for inserting an annotation made by a node of a data conferencing system having a plurality of nodes, wherein only one node at a time is an arbiter node. According to a preferred embodiment of the invention, the node inserts at an index for indexing an indexed object a container object for containing the annotation. If the node is not the arbiter node, then the node requests to be the arbiter node. If the node is the arbiter node, then the node determines whether the current indexed object is identical to the container object. If the current indexed object is not identical to the container object, then the node merges the annotation with the current indexed object and deletes the container object.

BRIEF DESCRIPTION OF THE DRAWINGS

These and other features, aspects, and advantages of the present invention will become more fully apparent from the following description, appended claims, and accompanying drawings in which:

FIGS. 5A–5E depict a timeline illustrating the a conditional insert or merge on two nodes of the conferencing system of FIG. 1, in accordance with a preferred embodiment of the present invention.

DESCRIPTION OF THE PREFERRED EMBODIMENT

System Hardware

Figure 1:
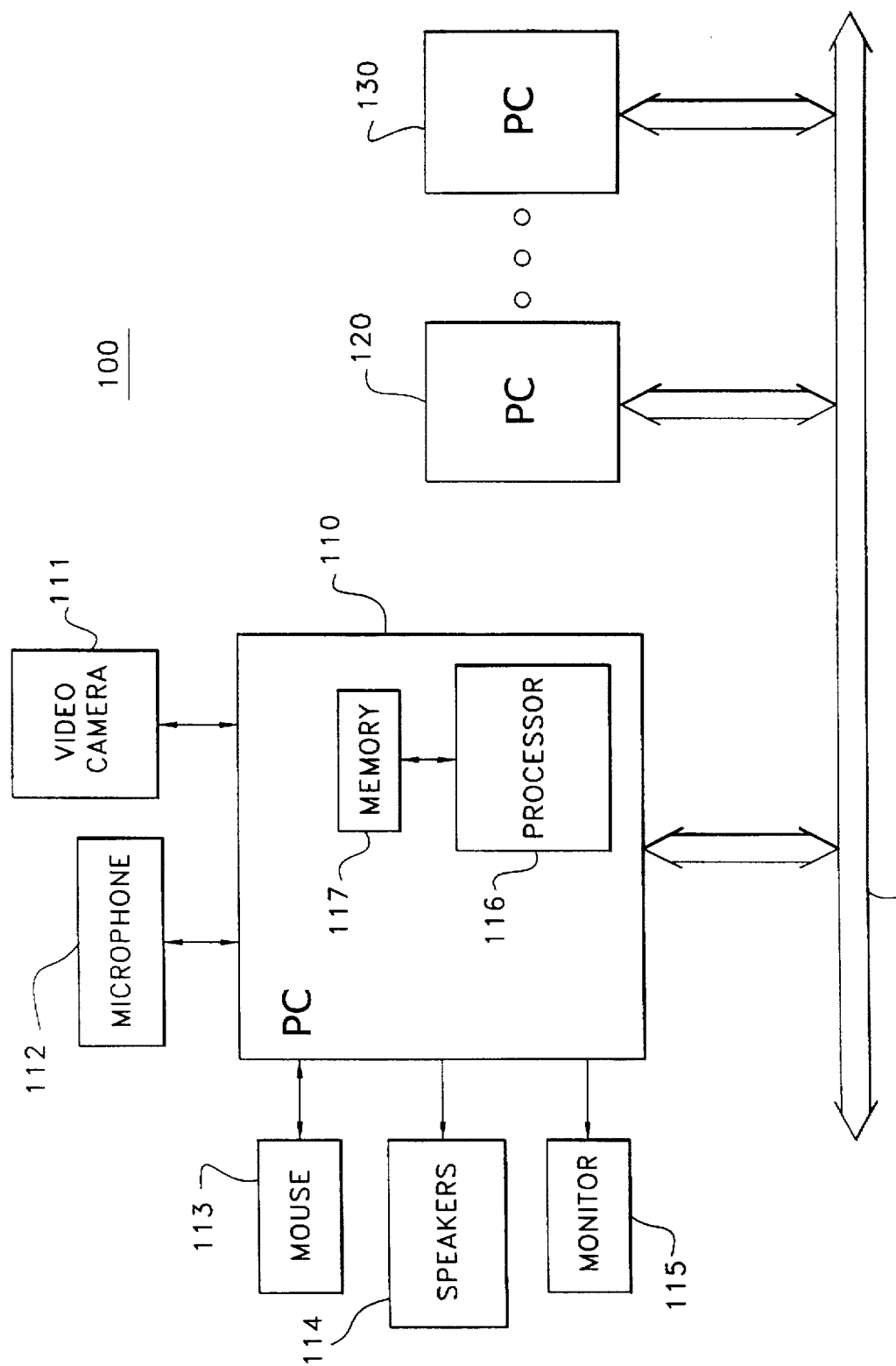
FIG. 1 shows a data conferencing system in accordance with a preferred embodiment of the present invention.

Referring now to FIG. 1, there is shown data conferencing system 100, in accordance with a preferred embodiment of the present invention. Data conferencing system 100 comprises a plurality of nodes or personal computers ("PC") 110, 120, 130. Personal computer or node 110 comprises a processor 116, memory 117, video camera 111, microphone 112, mouse 113, speakers 114, and monitor 115. Nodes 110, 120, 130 and other nodes of the data conference are interconnected via medium 101. Medium 101 may be, for example, a communication channel such as an Integrated Services Digital Network ("ISDN"). As will be understood, various nodes of a conferencing system may be connected through a variety of communication media, including local area networks ("LANs"), plain-old telephone lines ("POTS", sometimes referred to as public switched telephone networks ("PSTN")), and the like. In a multi-point conferencing system, a plurality of multi-point conferencing units ("MCUs") may also be utilized, as will be understood by those skilled in the art, to transmit data to and from various nodes or "endpoints" of the conferencing system. Nodes and/or MCUs may be interconnected via an ISDN link or through a local area network ("LAN"), in addition to various other communications media. Those skilled in the art will appreciate that nodes of a conferencing system may, in general, be connected directly to the communications medium such as a LAN or through an MCU, and that a conferencing system may comprise other nodes or elements such as routers or servers.

Processor 116 is preferably a general-purpose programmable processor, such as an Intel® Pentium™ processor. Those skilled in the art will also appreciate that processors of nodes of conferencing system 100 may also be a special-purpose video processor such as the Intel® 82750PB. As will be appreciated, the various peripherals and components of a node such as those of node 110 may vary from those of other nodes. Thus, node 120 and node 130 may be configured identically to or differently than node 110, as will also be understood. It will further be understood that a node may be implemented on any suitable computer system in addition to personal computer systems.

Distributed Data Conferencing

As explained, each node 110, 120, 130 of a data conferencing system is used by a user (or "agent") of the conference. The implemented conferencing system uses a distributed approach wherein each of the nodes maintains local copies of the conferencing structure (sometimes referred to as a "meeting"), which are to be consistent with one another. Using application programs such as video conferencing applications, all users participate in the meeting through their individual PCS and share data, graphics, text, and other types of information. Users may communicate with one another, sharing data in the form of graphical images, text, or other "annotations" and other information represented on a display such as one displayed on monitor 115 of PC 110. Thus, participants in the conference may add annotations, delete, or otherwise modify the commonly-viewed documents, images, screens, or other information which is shared in the data conference.

As will be appreciated, one of the requisites of a data conferencing system is the need to replicate the same data on all users' displays participating in the conference. In the present invention, multilevel arbitration is utilized to synchronize distributed data in a conference. Arbitration is employed at multiple levels of a distributed container object hierarchy, as explained in further detail below. In the present invention, "container objects" are defined to be either the generic holder of application-defined objects, or, if at the leaf of the hierarchy, an application-defined object itself. Requests to modify an object at one level of the hierarchy will not delay access or modification to objects at other independent levels. The present multilevel arbitration invention also allows arbitrator roles to shift independently to other nodes, as needed during the conference. This prevents any one node from being overburdened with the arbitration role. The present multilevel arbitration also allows object stores to be distributed to a subset of the conference nodes, which is useful for supporting "side chat" or private data exchange within a single general data conferencing application.

Figure 2:
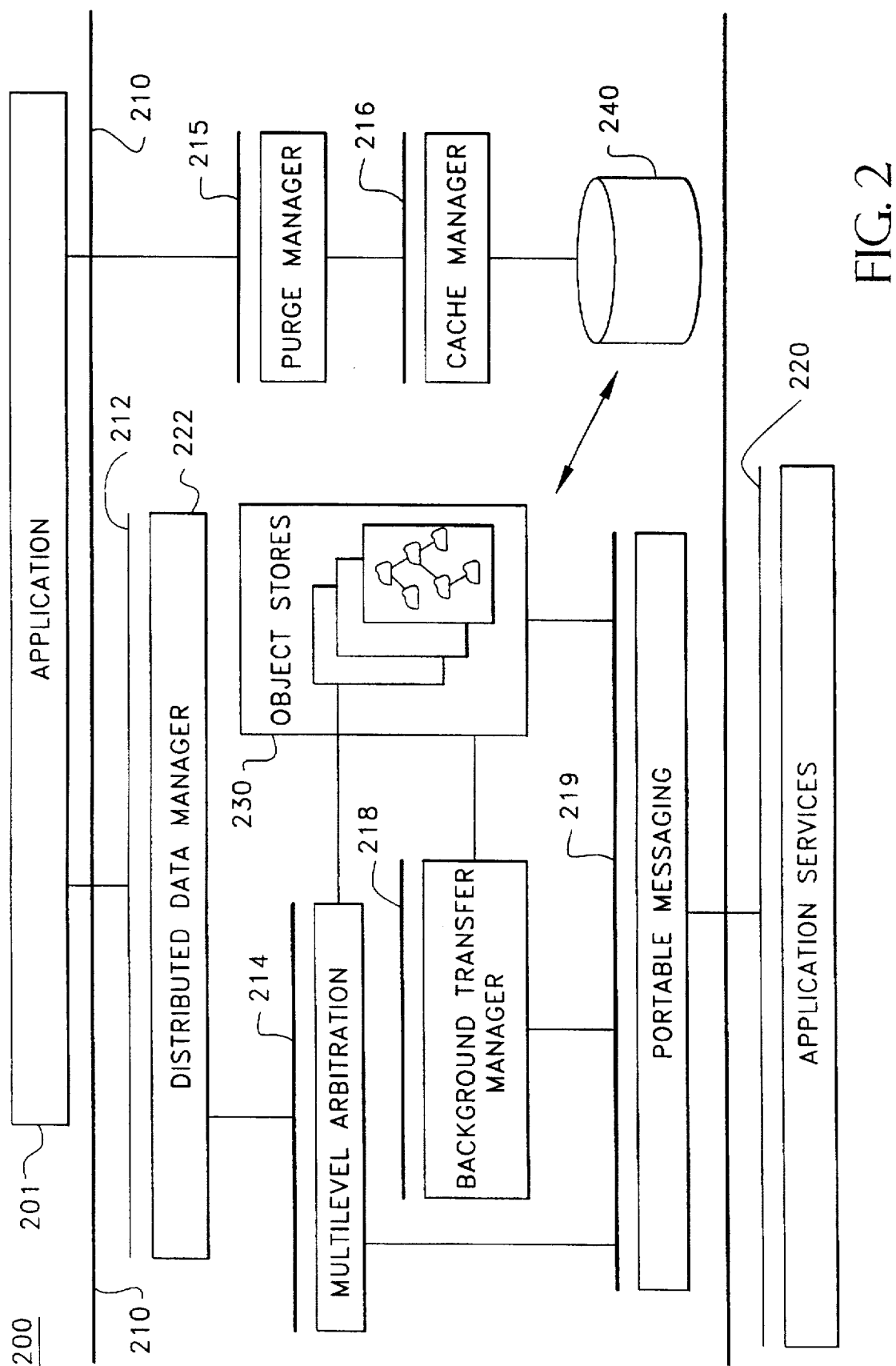
FIG. 2 depicts a block diagram representing aspects of a distributed data conferencing system in accordance with a preferred embodiment of the present invention.

Referring now to FIG. 2, there is shown a block diagram representing aspects of a distributed data conferencing system 200, in accordance with a preferred embodiment of the present invention. An application 201, such as a video conferencing application, runs on a plurality of nodes such as nodes 110, 120, 130 of FIG. 1. Various functional elements communicate via application programming interfaces ("APIs") such as APIs 210, 212, 214, 215, 216, 218, 219, 220. Distributed data manager ("DDM") 222 provides the ability to ensure that data is replicated as required. Multilevel arbitration 226 provides a mechanism for more efficiently arbitrating during a data conference, as described in further detail hereinbelow. As will be understood, a DDM is a library application that has responsibilities of managing application data in a distributed conference, and serves as a container that contains a plurality of object stores.

As will be appreciated, an object store is a hierarchical collection of objects. As those skilled in the art will understand, Booch notation is a standard notation for object-oriented analysis and design. This notation provides a notation for describing classes and relations therebetween, the structure of individual objects, and the like. In this regard reference is made to Grady Booch, *Objected Oriented Analysis and Design With Applications*, 2d. ed. (Benjamin Cummings Publishing Co., Inc., 1994), chapters 2, 3 and 5 of which are incorporated herein by reference. Basic definitions and discussion of objects may be found in chapter 1 of Peter Coad & Jill Nicola, *Object Oriented Programming* (Prentice Hall, 1993), chapter 1 of which is incorporated herein by reference. In the present invention, the object hierarchy model is application defined, and the object stores may be either distributed or local. Objects added to a distributed object store are replicated on all conference nodes. Further, support is provided for multiple simultaneous object stores.

The present system handles arbitration, distribution, and access to object store contents transparent to the application. Point-to-point and multipoint conferences are both possible in this system. Further, deferred synchronization is used for most operations to support non-blocking access by the application. With regard to storage, an object store resides in memory and can be saved to a file on disk, such as memory device 240. Stored files can be subsequently opened and object stores merged.

Figure 3:
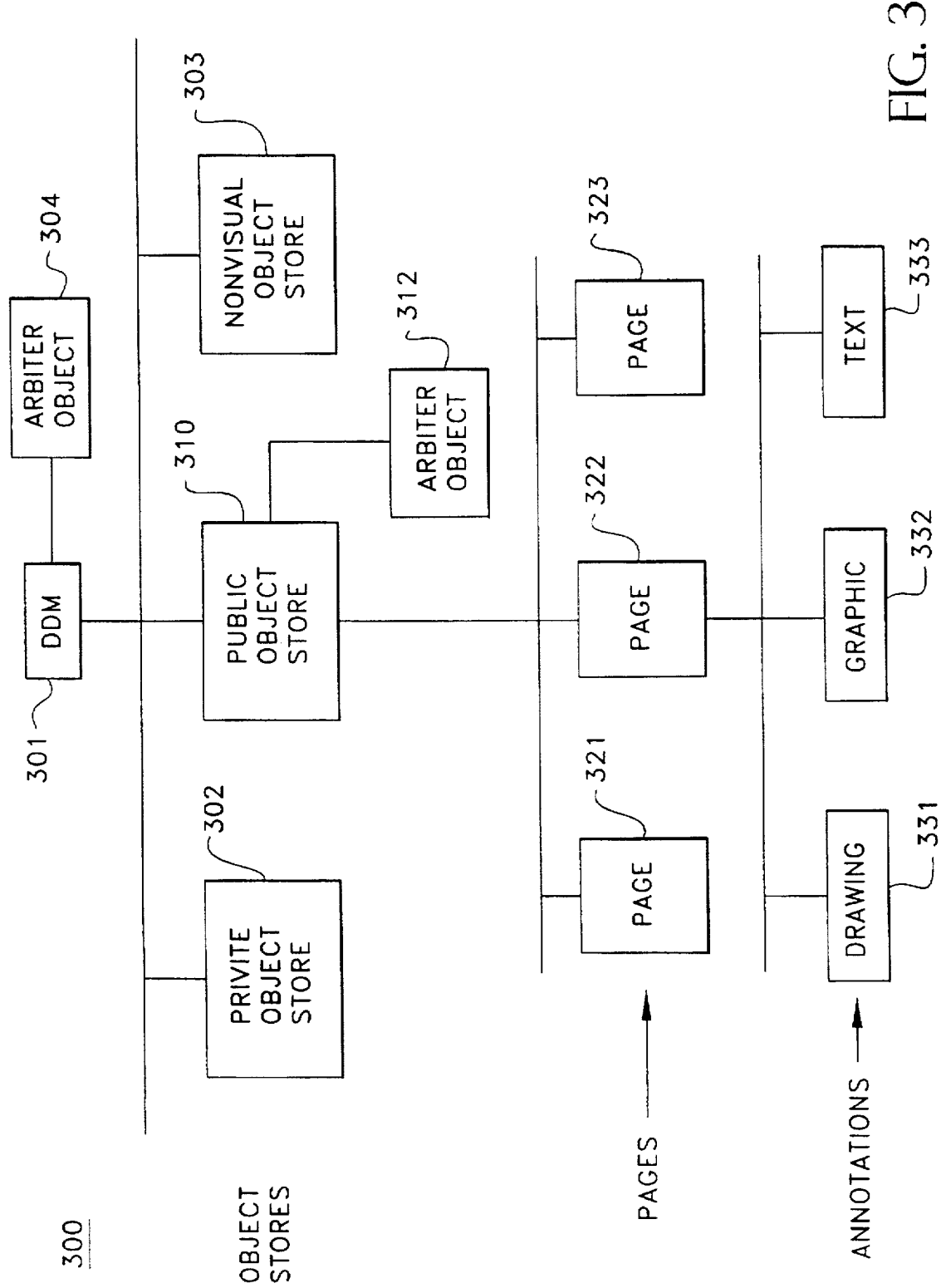
FIG. 3 is a schematic diagram of a data conference implemented on a node of the data conferencing system of FIG. 1, having multilevel arbitration in accordance with a preferred embodiment of the present invention.

Referring now to FIG. 3, there is shown a schematic diagram of a data conference 300 implemented on a node of the data conferencing system of FIG. 1, having multilevel arbitration in accordance with a preferred embodiment of the present invention. As will be understood, the elements of FIG. 3 represent the elements that constitute the data conference shared by nodes of data conferencing system 100 of FIG. 1. Thus, each node contains an instantiation of each element of FIG. 3, except for private object store 302, which contains local data. However, for any arbiter objects such as arbiter objects 312 and 304, each arbiter object will be active for only one node of the conference.

As will be understood by those skilled in the art, data conference comprises a DDM 301 running on each node of data conferencing system 100 of FIG. 1. DDM 301 manages various object stores, such as private object store 302, public object store 310, and nonvisual object store 303. Nonvisual object store is also a public, or shared, object store of the data conference, but contains nonvisual information or objects, such as program information. Arbitration for requests that affect any object stores at this level are handled by arbiter object 304, which is active only on one node of data conferencing system, which may be considered the arbiter node with respect to the hierarchical level of the data conference handled by arbiter object 304. DDM 301 supports a dynamic hierarchy of any depth, as defined by any given data conferencing application which is able to define its own structure and interpretation for objects of the conference. When a user of the conference makes a change, or annotates, an object of the conference such as the page, DDM 301 ensures that each annotation is distributed to each user or node of the conference.

In the hierarchical, multilevel data conference 300, a given object store can store subobjects, which may themselves store, manage, or point to other subobjects or object stores. As illustrated in FIG. 3, public object store 310 stores a plurality of pages of data, pages 321, 322, 323. Thus, public object store 310 serves as a root container for containing pages, which are stored in a memory such as memory 117. An object is a defined element, as will be understood by those skilled in the art, which contains data that specifically describes the object and methods for manipulating its data. For example, for an image-based object, the object will define certain ways of changing, shrinking, expanding, printing, saving the object to disk, and the like.

During the conference, various users may make various types of annotations to the page. For example, as shown, page 322 may be annotated with drawing annotation 331, graphic annotation 332, and text annotation 333. As will be understood, these annotation objects are contained by page 322.

Figure 4:
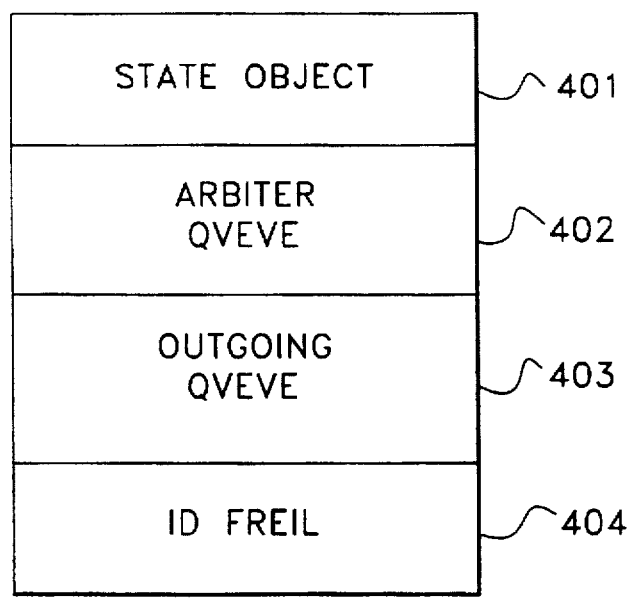
FIG. 4 shows an arbiter object in accordance with a preferred embodiment of the present invention.

Referring now to FIG. 4, there is shown an arbiter object 400 in accordance with a preferred embodiment of the present invention. Arbiter objects 304 and 312 of FIG. 3 are arbiter objects similar to arbiter object 400. As illustrated, in a preferred embodiment arbiter object 400 comprises four separate components: state object 401, arbiter queue 402, outgoing queue 403, and identification ("ID") field 404. As will be understood, arbiter object 400 is well-defined and allows for generality in implementation in a data conferencing system with multilevel arbitration. State object 401 indicates the current state of the arbiter object, such as "busy deleting," "busy adding," "busy merging," and the like. As will be appreciated, the state of arbiter object 400 changes automatically as various operations which arbiter object 400 arbitrates are performed. The arbiter object is, in general, not busy when it is not busy performing any of its possible arbitration functions.

Arbiter queue 402 is used to queue incoming requests. If arbiter object 400 is busy, as indicated by state object 401, an incoming request awaits servicing in arbiter queue 402. The queue of messages or requests stored in arbiter queue 402 are messages which are responsible for making the actual changes to the data conferencing structure. For example, for an "add" message, the add message comprises the actual text or page to be added to the conference, which object store will be added, at what index the new data will be added, and the like, as will be understood by those skilled in the art.

Outgoing queue 403 is used primarily when a data conference is first initiated, as the arbiter (e.g. the node of the data conference which has the active respective arbiter queue) is unknown at first. For example, when a new node joins a conference, until the arbiter node makes itself known, the new node queues up requests or messages in outgoing queue 403. ID field 404 indicates which node has the active version of the current arbiter object.

In the present invention, arbiter object 304 and arbiter object 312 may be active on different nodes of the data conference, as necessary. As will be appreciated, the present invention allows for multilevel arbitration. Arbiter object 304 handles requests that affect object stores contained by DDM 301, such as public object store 310 and nonvisual object store 303. For example, a node may request to add a new public object store, or to modify nonvisual object store 303. Arbiter object 312, on the other hand, handles requests that affect objects contained by public object store 310, namely pages such as pages 321, 322, 323. If arbiter object 304 is busy servicing a request affecting nonvisual object store 303, other requests, such as those affecting public object store 310, must be queued and wait. Similarly, if arbiter object 312 is busy servicing a request affecting page 323, a request to annotate page 322 must be queued and wait. However, because arbiter object 312 and arbiter be made to are independent, a change may be made to either public object store 310 or nonvisual object store 303, arbitrated by arbiter object 304, simultaneously with an annotation made to page 322, which is arbitrated by arbiter queue 312. Thus, the present invention provides a means for multilevel arbitration of requests that affect various objects of the data conference.

In alternative preferred embodiments, any given object of the data conference may provide an arbiter object to further avoid conflicts caused by busy arbiters. For example, each page 321, 322, and 323 could contain an arbiter object for handling annotations to its own page. Then, an annotation to page 321 and annotation to page 322 could be handled simultaneously by independent arbiter objects (not shown). Similarly, nonvisual object store 303 may also comprise its own arbiter object for arbitrating requests affecting objects contained by nonvisual object store 303 (not shown). It will also be understood that, in general, nonvisual object store 303 is a type of public object store, and that any number of object stores of a variety of types may exist at a given level of the hierarchical data conference.

Conditional Insert or Merge

Referring now to FIGS. 5A–5E, there is depicted a timeline illustrating, a conditional insert or merge on two nodes 110, 120 of conferencing system 100 of FIG. 1, in accordance with a preferred embodiment of the present invention. As shown in FIGS. 5A–5E, five successive time intervals $T_1$ to $T_5$ are illustrated for two nodes 110 and 120 of conferencing system 100. Each node 110 and 120 is illustrated as participating in a distributed data conference having a DDM. Thus each node comprises DDM 510, 520 respectively, and object stores 511, 521. As will be understood, each object of a distributed data conference is assigned a unique identifier. Thus, object store 511, 521, which are identical at time $T_1$ on both nodes 110 and 120, has ID=99, as shown in FIGS. 5A–5E. At time $T_1$, node 120 has the active arbiter object 530, as illustrated. As will be understood, active arbiter 530 is representative of an arbiter object such as arbiter object 304 of FIG. 3. Node 110 in FIGS. 5A–5E also comprises a corresponding arbiter object (not shown), which is, however, not active at $T_1$. As will also be understood in view of the disclosure hereinabove, there may be numerous arbiters at various locations within a data conference, however only one arbiter may have jurisdiction over operations in a given sub-tree of the object hierarchy at any one time in the conference.

As will be appreciated, at this initial state, no page object has yet been created to be contained by object store 511, 521. Instead, a blank screen may be presented to the users of nodes 110, 120 and a new page created upon the first annotation. Otherwise, a plurality of blank pages, one for each node of the conference, may have to be created, which is undesirable in a conferencing application. If a user of node 120 were to annotate the blank screen (or, alternatively, to annotate a new screen after some pages have already been created), a new page would be created, contained by object store 521, and annotated with the annotation. Then, the new page would be distributed to other nodes of the conference such as node 110, as well as node 120's annotation. Thereafter, if a user of node 110 desired to further annotate the newly-created page, he would be free to do so. The two annotations may follow closely in time, node 120 creating a new page to contain a first annotation, with node 110 receiving the new page and annotation and further annotating the new page with a second annotation only a short time later. The second annotation is then distributed to other nodes of the conference, as will be understood.

However, as described hereinabove, problems arise when more or less simultaneous annotations are made upon a blank screen (i.e., where no page container has yet been created to store the annotations) by more than one user. Then, two separate pages containing the two annotations would be created and distributed to nodes of the data conference. This problem is undesirable, for example because to a user there should not be different results (i.e., either one page with both annotations or two pages with the separate annotations) depending upon an arbitrary criterion such as whether two or more users begin to annotation simultaneously or within a few seconds of one another.

Therefore, the conditional insert and merge of the present invention provides a means and method for addressing this problem. Referring once more to FIG. 5B, at time $T_2$ both node 110 and 120 have created new pages at index "0", i.e. pages 512 and 522, in response to an annotation upon a blank screen by a user thereof. For example, a user of node 110 may begin a drawing, annotation such as drawing annotation 331 of FIG. 3, while the user of node 120 may begin a text annotation such as text annotation 333 of FIG. 3. At this time, pages 512 and 522 are not identical as should ultimately be the case in a distributed data conference. Each page has a unique identifier assigned thereto, which differ from each other. Thus, as shown, page 512 has ID=94, while page 522 has ID=A4. As will be understood, object store 511 stores or contains page 512, and object store 521 contains page 522.

Referring now to FIG. 5C, at time $T_3$ each node 110, 120 has added its user's local annotation to page 512 or 522, respectively. These annotation have different IDs, not only because they are not the same annotation, but because the conference has not yet caused the data to be distributed at time $T_3$. Thus, annotation 513, which may be, for example, a drawing annotation such as a diagonal line, has ID=90; annotation 523, which may be a text annotation such as the typed text "HELLO", has ID=A5. At this point, because node 120 is the arbiter node, i.e. it has the active arbiter 530, its page 522, at index 0, with ID=A4, has been created in the conference, though not yet distributed. However, node 110 only creates page 512 at temporary index 0, since it is not the arbiter node. Despite this, however, the user of node 110 may continue to annotate during this process since temporary page 512 has been created to store annotations. Thus, node 110 requests to be the active arbiter since it needs to create a new page or to merge its annotation. (As will be appreciated, this request may be stored in arbiter queue 402 of FIG. 4.) Meanwhile, node 120 distributes its page 522 (at index 0) and annotation 523 to other nodes of the conference, including node 110. Thus, page 522 (having ID=A4) is inserted at index 0 in node 110, which changes page 512 (ID=94) to index 1.

Figure 5D:
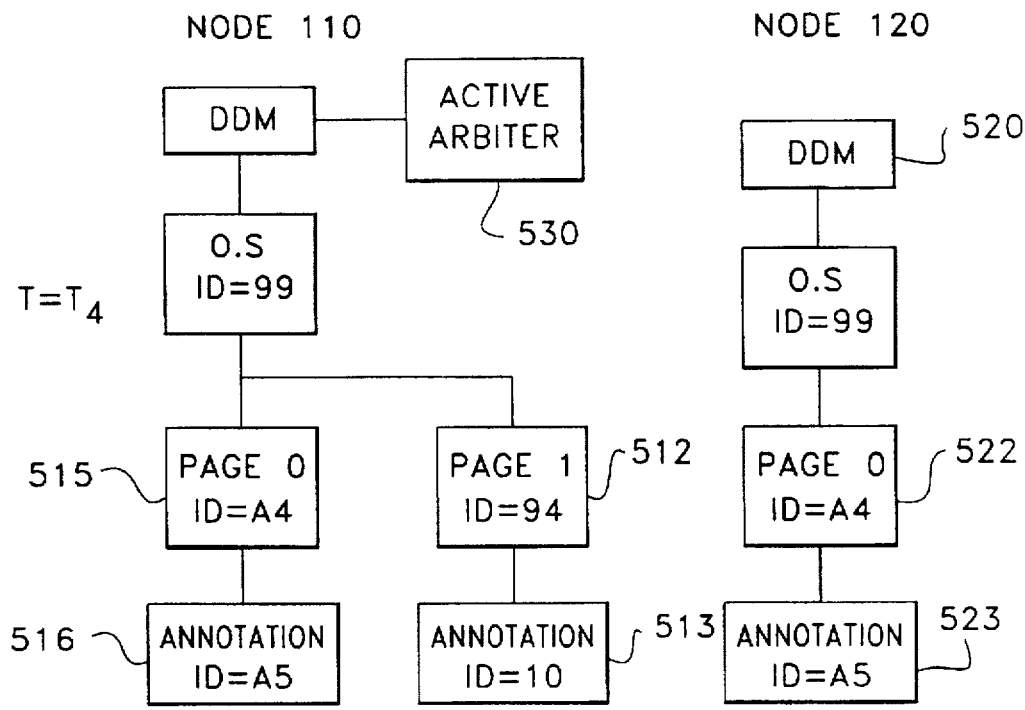
Figure 5E:
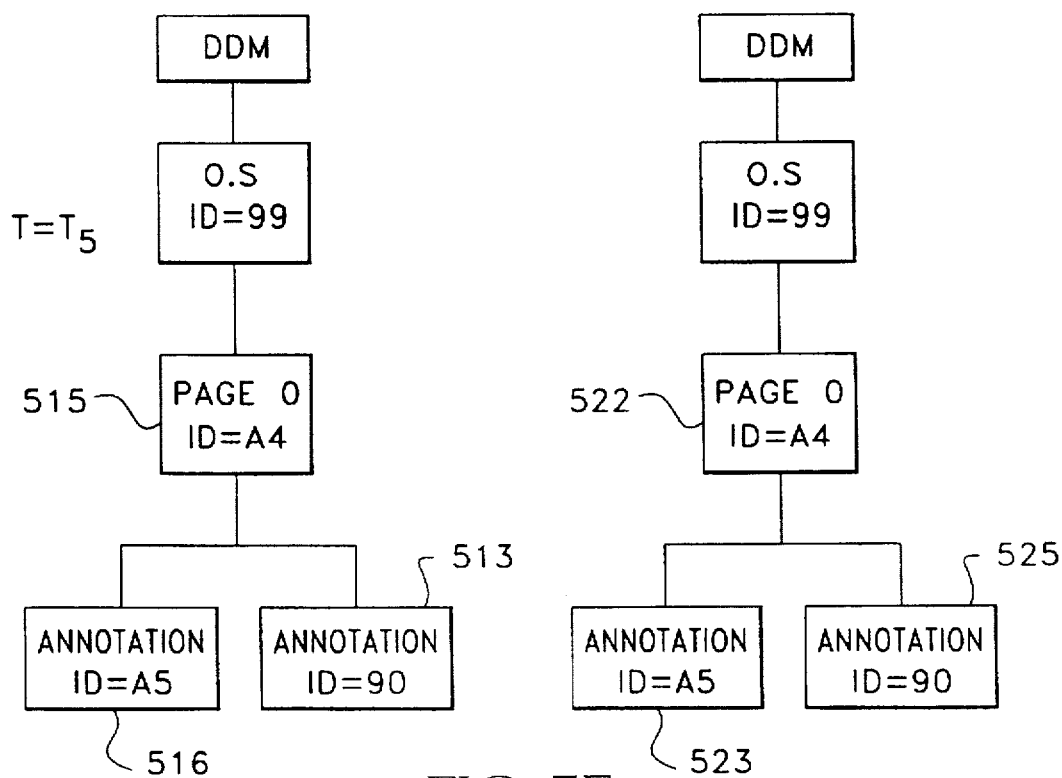

As shown in FIG. 5D, at time $T_4$, node 110 has become the active arbiter as shown by active arbiter 530. Node 110 has also received page 522 (at index 0) and annotation 523 from node 120, as illustrated by page 515 and annotation 516 of node 110, which have the same IDs as page 522 and annotation 523 of node 120, i.e. IDs A4 and A5, respectively. The index of temporary page 512 has been changed from index 0 to index 1, as shown, to make way for the recently distributed page 515 which was inserted at index 0. Thus, at this point node 110 is able to know that a simultaneous insert or merge condition has occurred, since the temporary page 512 that it created when it was not arbiter has had its index changed. Thus, node 110 merges annotation 513 with annotation 516 so that both are contained by page 515, and also deletes page 512. Page 515, at index 0, thus contains both annotations 516, 513, just as would have occurred if the two annotations had occurred non-simultaneously, as illustrated for node 110 of FIG. 5E at time $T_5$. Node 110, while still the arbiter node, also distributes new annotation 513 to other nodes of the data conference, including node 120, so that the page with ID=A4 (page 522 of node 120) also contains both annotation 523 and new annotation 525, as illustrated in FIG. 5E at time $T_5$. It will be appreciated that the temporary configuration depicted at time $T_4$ in FIG. 5D is not visible to the user of node 110, since the relevant application running on node 110 is not yet updated. However, until pages 515 and 512 and their respective annotations are merged at time $T_5$, the user of node 110 is able to continue annotating page 512. Thereafter, node 120 takes any necessary action required such as repainting the display new annotations in page 522 (ID=A4), such as annotation 525 (ID=90). Node 110 also takes any actions required, e.g. to take into account that contents of page 512 (i.e., annotation 513) have been merged into page 515, and that page 512 has been deleted.

Figure 6:
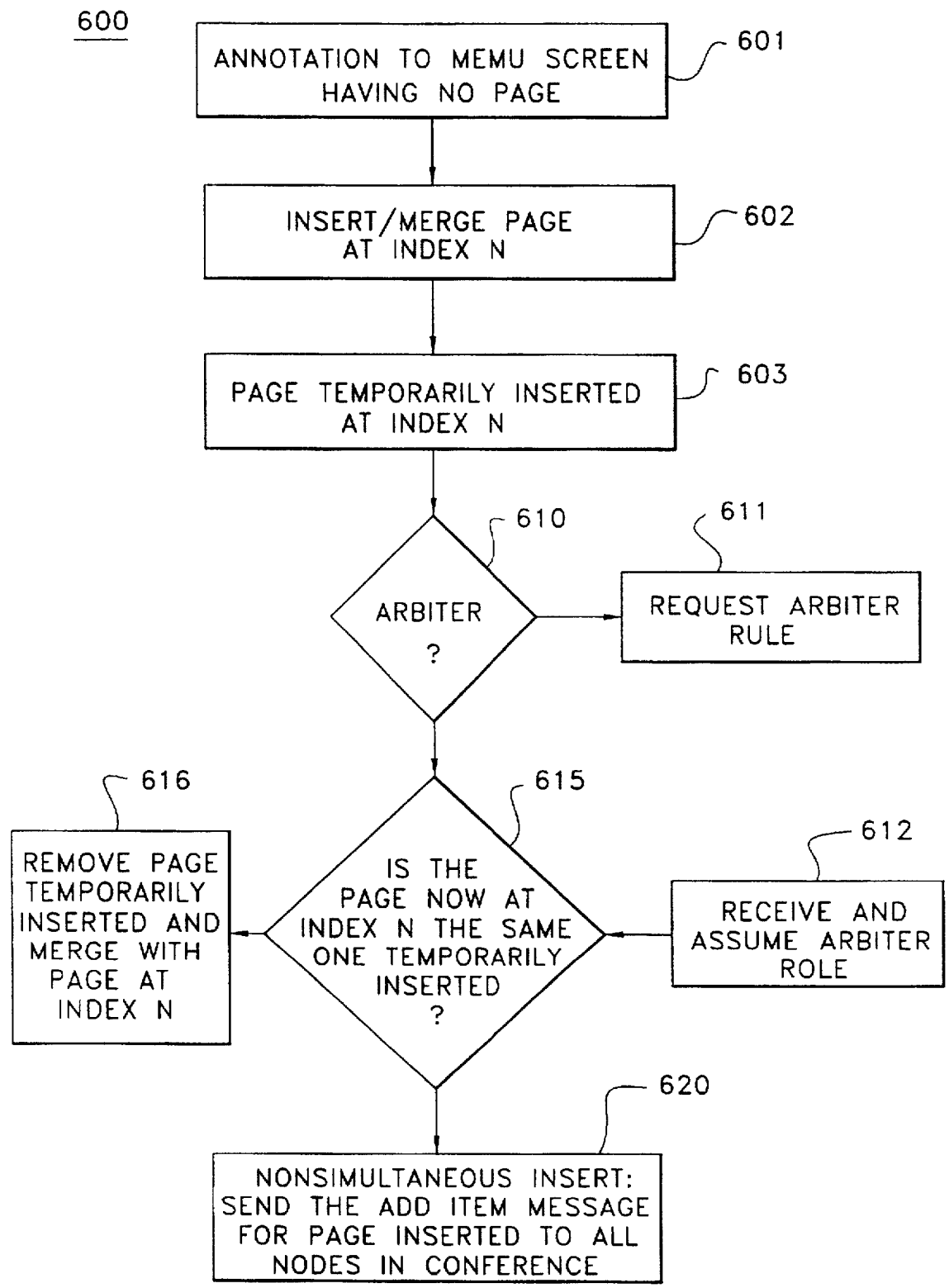
FIG. 6 is a flow chart illustrating the method of operation of a node of the conferencing system of FIG. 1 in accordance with the conditional insert or merge of FIGS. 5A–E.

Referring now to FIG. 6, there is shown a flow chart 600 illustrating the method of operation of nodes of conferencing system 100 of FIG. 1 in accordance with the conditional insert or merge of FIGS. 5A–5E. As illustrated in step 601 of FIG. 6, the node makes an annotation to a new screen not yet having a page container created. This may be a first, blank screen when no pages have yet been created, or a new screen annotated after other pages already exist in the conference. The node then inserts a page at index N (step 602). At this point, the page is temporarily inserted at index N (step 603). If the node is the arbiter node (step 610), then the node tests whether the temporary page is the same one as the page currently at index N (step 615). If the node is not the arbiter node, it requests the arbiter role (steps 610, 611). Eventually, the arbiter role will be received and assumed by the node (step 612), and the test of step 615 may be performed. As will be understood, this test (step 615) is performed because after the insert of the temporary page at index N another simultaneous insert may have occurred on another node and may have in the meantime been inserted at index N, causing the temporary page's index to change.

Thus, if the page currently at index N is not the same as the one temporarily inserted (i.e., their conference IDs are different), then a simultaneous annotation is detected, and the temporary page is removed and its annotation(s) merged with the page currently at index N (step 616). Otherwise, if the page at index N is the one temporarily inserted, then no simultaneous annotation condition has occurred, and an "AddItem" message is sent to all other nodes in the conference to distribute the inserted page as well as its annotation.

As will be understood, when method 600 is applied independently by both nodes 110, and 120 of conferencing system 100, the actions as depicted in the timeline of FIGS. 5A–5E result.

Those skilled in the art will further appreciate that the conditional insert and merge of the present invention may also be extended to any number of nodes in a conference.

As will be understood, the present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for inserting an annotation made by a node of a data conferencing system having a plurality of nodes, wherein only one node at a time is an arbiter node, the method comprising the steps of:

(a) inserting at an index for indexing an indexed object a container object for containing the annotation;

(b) if the node is not the arbiter node, then requesting to be the arbiter node;

(c) if the node is the arbiter node, then determining whether the current indexed object is identical to the container object; and (d) if the current indexed object is not identical to the container object, then merging the annotation with the current indexed object and deleting the container object.

2. The method of claim 1, wherein the data conferencing system supports a data conference having a plurality of conference objects distributed among nodes of the data conference, each conference object having a unique identifier, wherein the determining of step (c) comprises the step of determining whether the identifier of the current indexed object is identical to the identifier of the contained object.

3. The method of claim 1, wherein the container object is a page object.

4. The method of claim 1, comprising the further step of:

(e) if the current indexed object is identical to the container object, then transmitting a message from the node to all other nodes of the plurality of nodes to distribute the container object and the annotation to the other nodes of the plurality of nodes.

5. The method of claim 1, wherein step (d) comprises the step of:

if the current indexed object is not identical to the container object, then (1) merging the annotation with the current indexed object and deleting the container object, and (2) transmitting a message from the node to all other nodes of the plurality of nodes to distribute the annotation to the other nodes of the plurality of nodes.

6. The method of claim 1, wherein the annotation may be a text annotation, a graphic annotation, or a drawing annotation.

7. The method of claim 1, wherein step (b) comprises the step of:
if the node is not the arbiter node, then requesting to be the arbiter node and becoming the arbiter node when the request is granted.

8. The method of claim 1, wherein step (b) comprises the step of:
if the node is not the arbiter node, then:
(1) requesting to be the arbiter node; and
(2) waiting for the request to be granted before performing the determining of step (c).

9. The method of claim 1, wherein the annotation is initially inserted on a blank screen when no container object has yet been created to contain the annotation.

10. A data conferencing system for inserting an annotation made by a node of the data conferencing system, the data conferencing system having a plurality of nodes, wherein only one node at a time is an arbiter node, the data conferencing system comprising:
(a) means for inserting at an index for indexing an indexed object a container object for containing the annotation;
(b) means for requesting to be the arbiter node if the node is not the arbiter node;
(c) means for determining, if the node is the arbiter node, whether the current indexed object is identical to the container object; and
(d) means for merging the annotation with the current indexed object and deleting the container object, if the current indexed object is not identical to the container object.

11. The data conferencing system of claim 10, wherein the data conferencing system supports a data conference having a plurality of conference objects distributed among nodes of the data conference, each conference object having a unique identifier, wherein the determining of means (c) comprises means for determining whether the identifier of the current indexed object is identical to the identifier of the contained object.

12. The data conferencing system of claim 10, wherein the container object is a page object.

13. The data conferencing system of claim 10, further comprising:
(e) means for transmitting, if the current indexed object is identical to the container object, a message from the node to all other nodes of the plurality of nodes to distribute the container object and the annotation to the other nodes of the plurality of nodes.

14. The data conferencing system of claim 10, wherein means (d) comprises:
(1) means for merging the annotation with the current indexed object and deleting the container object if the current indexed object is not identical to the container object, and (2) means for transmitting, after the merging of means (d)(1), a message from the node to all other nodes of the plurality of nodes to distribute the annotation to the other nodes of the plurality of nodes.

15. The data conferencing system of claim 10, wherein the annotation may be a text annotation, a graphic annotation, or a drawing annotation.

16. The data conferencing system of claim 10, wherein means (b) comprises means for requesting to be the arbiter node and becoming the arbiter node when the request is granted, if the node is not the arbiter node.

17. The data conferencing system of claim 10, wherein means (b) comprises:

(1) means for requesting to be the arbiter node if the node is not the arbiter node; and
(2) means for waiting for the request to be granted before performing the determining of means (c).

18. The data conferencing system of claim 10, wherein the annotation is initially inserted on a blank screen when no container object has yet been created to contain the annotation.

19. A storage medium having stored thereon a plurality of instructions for inserting an annotation made by a node of a data conferencing system having a plurality of nodes, wherein only one node at a time is an arbiter node, wherein the plurality of instructions, when executed by a processor of the node, cause the node to perform the steps of:
(a) inserting at an index for indexing an indexed object a container object for containing the annotation;
(b) if the node is not the arbiter node, then requesting to be the arbiter node;
(c) if the node is the arbiter node, then determining whether the current indexed object is identical to the container object; and
(d) if the current indexed object is not identical to the container object, then merging the annotation with the current indexed object and deleting the container object.

20. The storage medium of claim 19, wherein the data conferencing system supports a data conference having a plurality of conference objects distributed among nodes of the data conference, each conference object having a unique identifier, wherein the determining of (c) comprises the step of determining whether the identifier of the current indexed object is identical to the identifier of the contained object.

21. The storage medium of claim 19, wherein the container object is a page object.

22. The storage medium of claim 19, wherein the plurality of instructions cause the node to perform the further step of:
(e) if the current indexed object is identical to the container object, then transmitting a message from the node to all other nodes of the plurality of nodes to distribute the container object and the annotation to the other nodes of the plurality of nodes.

23. The storage medium of claim 19, wherein step (d) comprises the step of:
if the current indexed object is not identical to the container object, then (1) merging the annotation with the current indexed object and deleting the container object, and (2) transmitting a message from the node to all other nodes of the plurality of nodes to distribute the annotation to the other nodes of the plurality of nodes.

24. The storage medium of claim 19, wherein the annotation may be a text annotation, a graphic annotation, or a drawing annotation.

25. The storage medium of claim 19, wherein step (b) comprises the step of:
if the node is not the arbiter node, then requesting to be the arbiter node and becoming the arbiter node when the request is granted.

26. The storage medium of claim 19, wherein step (b) comprises the step of:
if the node is not the arbiter node, then:
(1) requesting to be the arbiter node; and
(2) waiting for the request to be granted before performing the determining of step (c).

27. The storage medium of claim 19, wherein the annotation is initially inserted on a blank screen when no container object has yet been created to contain the annotation.

* * * * *